May 8, 1923.  1,454,681
H. LATIFF
VEHICLE CURTAIN CONSTRUCTION
Filed Dec. 19, 1921    3 Sheets-Sheet 2
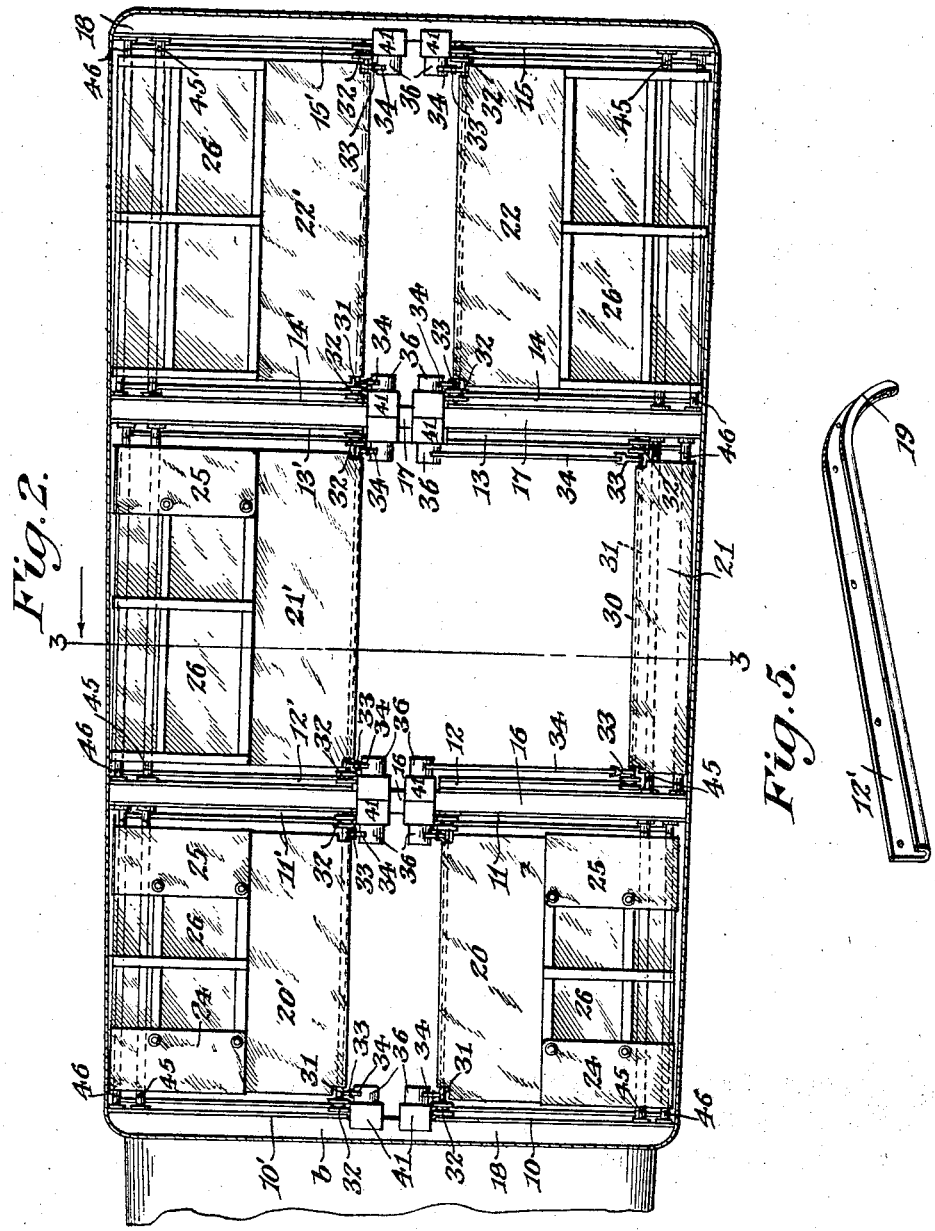
Henry Latiff, INVENTOR.
BY Geo. P. Kimmel
ATTORNEY.

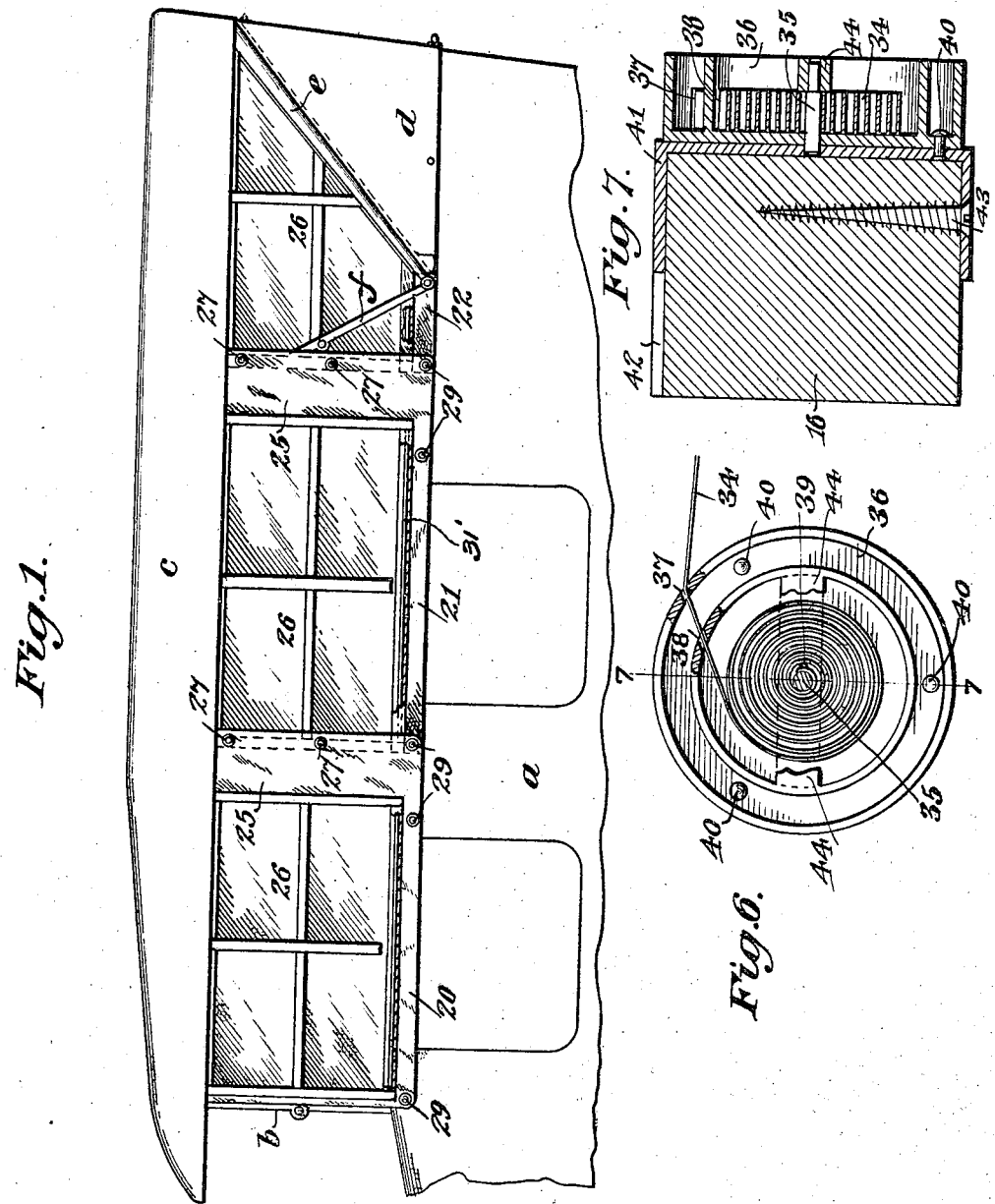

May 8, 1923.
H. LATIFF
1,454,681
VEHICLE CURTAIN CONSTRUCTION
Filed Dec. 19, 1921     3 Sheets-Sheet 3
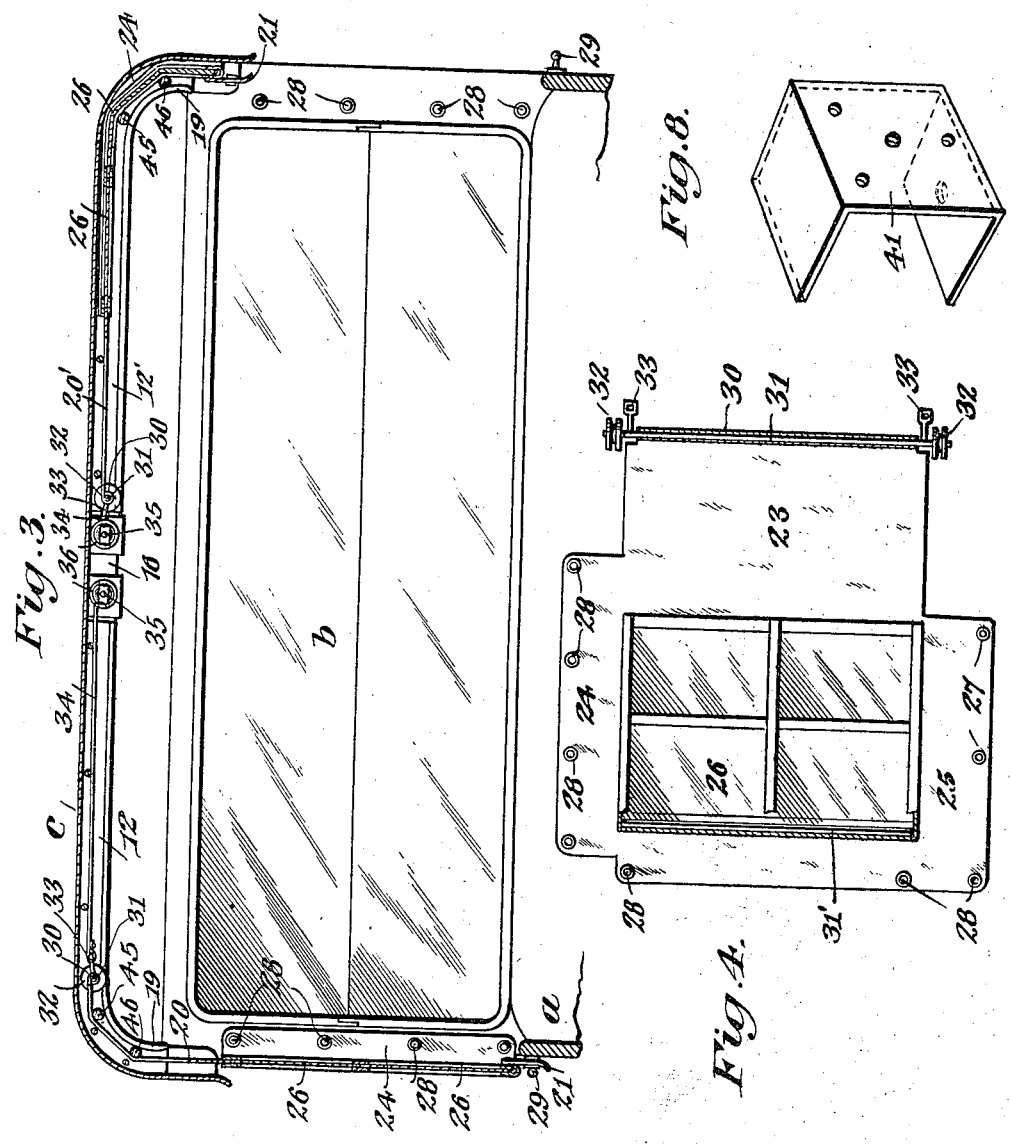
Henry Latiff, INVENTOR.
BY Geo. P. Kimmel.
ATTORNEY.

Patented May 8, 1923.

1,454,681

UNITED STATES PATENT OFFICE.

HENRY LATIFF, OF MIDDLESBORO, KENTUCKY.

VEHICLE CURTAIN CONSTRUCTION.

Application filed December 19, 1921. Serial No. 523,400.

*To all whom it may concern:*

Be it known that I, HENRY LATIFF, a citizen of the United States, residing at Middlesboro, in the county of Bell and State of Kentucky, have invented certain new and useful Improvements in Vehicle Curtain Constructions, of which the following is a specification.

This invention appertains to certain improvements in curtain constructions for vehicles generally, and more particularly to a side curtain structure adapted for use on automobiles and the like.

The principal object of the invention is to provide for a curtain structure of the class set forth, and one adapted to be permanently installed in position ready for instant use, and which, when not in use, is retained in position out of the way of the occupants of the vehicle, and in a manner less liable to injury or deterioration as compared with present curtain structures and methods of installations.

Another important object of the invention is to provide for side curtain constructions for automobiles and the like, wherein the curtains are maintained in unrolled condition at all times in their operative and inoperative use, and consequently are less liable to have the fabric or other material from which such curtains are generally made, or the flexible light inserts thereof cracked, torn or broken, or otherwise damaged, such as is now common, when the curtains are not in use and stored or maintained in out-of-the-way places within the automobile or vehicle.

A further object of the invention is to provide for side storm curtain constructions for automobiles and mountings therefor, which are capable of being installed in permanent positions of operation on the underside of automobile, or other vehicle tops suitable for the purpose, and in a manner to avoid any modifications of or departure from the usual form of such tops.

With the foregoing and other objects in view, the invention resides in the certain novel and useful construction, arrangement and operation of vehicle curtains as will be hereinafter more fully described, set forth in the appended claims, and illustrated in the accompanying drawings, in which:—

Figure 1 is a fragmentary side elevation of a conventional form of automobile body and top construction, and showing a preferred embodiment of the curtain constructions as applied thereto, and as they appear when in operative or side closing positions, Figure 2 is a horizontal section taken on the line 2—2 of Figure 1, and shows the manner of installing or mounting a set of the curtains at the underside of the top of the vehicle or automobile, Figure 3 is a vertical transverse section taken on the line 3—3 of Figure 2, Figure 4 is a plan view, partly in section, of one of the curtain structures per se, Figure 5 is a perspective view of one of the guide rails on which the curtains are to be operably mounted.

Figure 6 is an enlarged front elevation of one of the spring drums for effecting the return of the curtains to manually inoperative position, Figure 7 is an enlarged transverse section through one of the top supporting bows, and showing the manner of mounting one of the spring drums thereof, and, Figure 8 is a perspective view of one of the metal clips or brackets for mounting the spring drums in position on the supporting bows of the vehicle or automobile top.

Referring to the drawings, wherein similar characters of reference designate corresponding parts throughout the several views thereof, *a* indicates a conventional form of vehicle body, preferably that of an automobile, *b* the wind shield mounted above the dash of the body, *c* the covering of the top of the body, *d* the back curtain, *e* the metal bows supporting the rear end of the top, and *f* the hinged braces for maintaining the top in operative position.

In the installation of the side storm or weather curtains in position, and in accordance with the present invention, oppositely disposed track-way sections 10, 10'; 11, 11'; 12, 12'; 13, 13'; 14, 14'; and 15, 15', are secured in spaced end to end relation at the underside of the top coverings *c*, the sections 10, 10' along the upper horizontal edge of the frame of the wind shield *b*; the sections 11, 11' at the front side edge of the first of the top covering supporting bows 16 extending transversely of the body *a* and complemental to the track-way sections 10, 10'; the sections 12, 12' to the rear side of the bow 16 and complemental to the sections 13, 13' secured to the front side of an intermediate top covering supporting bow 17: and the sections 14, 14' to the rear side of the bow 17 and complemental to the trackway sections 15, 15' secured along the inner side of a rear top covering supporting bow 18. The outer end portions of each of the track-way sections are curved as at 19 correspondingly with the usual curvature of the opposite ends of the transverse bows 16, 17 and 18, and the free ends of these curved portions 19 are disposed in the plane of the opposite sides of the body $a$ of the automobile or vehicle substantially as is shown.

Mounted at opposite sides of the top are pairs of side curtains 20, 20'; 21, 21'; and 22, 22', the curtains 20, 20', operating between the complemental track-way sections 10, 11 and 10' and 11', respectively; the curtains 21, 21', between the complemental track-way sections 12, 13, and 12', 13'. respectively; and the curtains 22, 22', between the complemental track-way sections 14, 15, and 14', 15', respectively. As shown in Figure 4, each of the curtains 20, 20', 21 and 21' are formed of a sheet of suitable material cut on lines to provide a centrally elongated portion 23, and oppositely disposed side flap portions 24 and 25, the lower portions of the central portion 23, between the flap portions 24 and 25 being cut away to provide an opening or openings for the insertion therein of sheets of transparent material 26. The rearwardly disposed of the side curtains 22, 22', when the back curtain $d$ is of the so-called gypsy type of curtain, wherein the opposite ends thereof extend for a distance around the rear sides of the vehicle or automobile and are cut on diagonal lines correspondingly with the rearward inclination of the metal bows $e$, are also cut on diagonal lines at their lower edge portions in a manner to overlap the diagonally cut edge portions of the back curtain $b$, but have a horizontally disposed lower edge portion, extending forwardly of the lower end of the diagonally disposed edge portion, to overlap the upper edge of the body $a$, when in lowered or closed position. When all of the curtains, or any of the adjacent pairs thereof, are lowered, the complementary disposed flaps 24 and 25 thereof are moved into overlapping relation, preferably the flaps 25 over the adjacent flaps 24, and may be fastened together by means of fasteners 27, while the flap portions 24 of the front pair of curtains 20, 20', are to be turned inwardly and secured to the vertical bars of the frame of the wind shield $b$ by means of fasteners 28, and similarly, the diagonal edges of the curtains 22, 22', are to be secured in overlapping relation with respect to the diagonal edges of the back curtain $d$ and to the inner sides of the bows $e$, by means of fastenings (not shown). In lowered side closing positions, the lower horizontal edges of the several curtains are also fastened by means of fasteners 29 to and along the outer side of the opposite side walls of the body $a$. The upper edges of the central portions 23 of each of the curtains are folded upon themselves and stitched or otherwise fastened together in a manner to provide tubular portions 30, through which are passed rods 31 having grooved rollers 32 on their opposite ends for rolling engagement with their respective track-way sections, whereby to facilitate the movements of the curtains to and from operative positions.

For effecting the raising of the several curtains from lowered positions individually, each of the rods 31 carried thereby are formed at their opposite ends to provide eyes or the like 33 spaced slightly inward from the rollers 32, and secured in these eyes 33 are the outer ends of steel tapes or the like 34, which are normally wound on pins 35 journaled in circular drums or housings 36 secured in pairs on the top covering bows 16, 17 and 18, and the top edge of the frame of the wind shield $b$, and between the inner spaced ends of the several track-way sections 10, 10'; 11, 11'; 12, 12'; 13, 13'; 14, 14'; and 15, 15', substantially as is shown in Figures 2 and 3. These spring steel tapes 34 extend inwardly of the under side of the top $c$, from their points of connection with the eyes 33, and in parallel relation with respect to the adjacent trackway sections, and pass inwardly of a slotted opening 37 formed in the outer circular wall of each of the housings or drums 36 and the complementally slotted openings formed in the inner circular walls disposed concentrically of each of the latter, and from thence are coiled about the pins 35, as aforesaid, and have their inner ends secured thereto by means of screws or the like 39, which pins 35 are journaled for rotation centrally of the housings or drums 36, substantially as is shown in Figures 6 and 7. Each of the drums or housings 36 are secured in position, and against rotation, by means of rivets 40, to substantially V-shaped brackets or clips 41, which are, in turn, secured in position on the top bar of the frame of the wind shield $b$ and the supporting bows 16, 17 and 18, and, as shown in Figure 7, the upper horizontal portion of the brackets or clips 41 are seated in grooves 42 extending transversely of the upper side faces of the bows 16, 17 and 18, and, if necessary, of the upper side of the wind shield frame $b$, so that the top covering $c$ will lie flat on the bows and frame and be free from wear and tear, such as would possibly occur to the same, if the upper legs of the brackets or clips 41 were merely engaged over the upper edges of the supporting parts of the top. Each of the brackets or clips 41 are fastened in position by means of screws or the like, 43, and have their intermediate or connected portions formed to provide centrally disposed openings, which are registered with similarly formed openings in the abutting walls of the drums or housings 36, for the journaling therein of the inner ends of the pins 35, while the outer ends of the latter are journaled in cross bars 44 extending diametrically of the inner circular walls 45 of the drums or housings 36, substantially as is shown in Figures 6, 7 and 8. To facilitate the curtains being disposed in the vertical plane of the outer side walls of the vehicle body $a$ and to hang in straight position, without any undue loose or buckled effects, when lowered to side closing position, upper and lower rods or rollers 45 and 46 are provided at the curved end portions 19 of the several track-way sections, and act to support the curtains in their passage to and from their normal positions under the top covering $c$, and the lower of these rods or rollers 46 act to maintain the upper portions of the curtains in their desired position, as hereinbefore noted for the same, when operated.

With the curtains mounted in normal inoperative positions, any one of the same may be moved to lowered position by grasping the lower free edge thereof and pulling downward on the same, when the rollers 32 will move outwardly along the track-ways, and the spring plates 34 will unwind from the pins 35, and, when fully lowered, the fastenings 28 at the lower edge of the curtain will be engaged on the complemental fastenings provided for the purpose on the outer side of the body $a$, which operation will be repeated on all of the curtains when it is desired to completely close the opposite open sides of the vehicle. When all of the curtains are drawn to closed position, the front curtains 20, 20', will be fastened at their lower edges to the body $a$, by means of the fastenings 29 complemental thereto, and the side flaps 24 thereof turned inwardly and secured by the fastenings 28 to the rear or inner sides of the wind shield $d$, when the curtains 21, 21', will be drawn downwardly and secured at their lower edges to the body $a$ and fastened thereto with the forward flap 24 thereof engaged under the rear flaps of the curtains 20, 20', which flaps 24 and 25 may be fastened together by means of the fastenings 27 thereon, or be left unfastened as may be desired. Similarly, the rear side curtains 22, 22', will be pulled downwardly and the diagonal edges thereof, together with the complemental diagonally arranged edges of the back curtain $d$, secured to the inner side of the inclined bows $e$, while the lower horizontal edges thereof will be fastened directly to the upper sides of the body $a$. The rear flaps 24, of the curtains 21, 21'. may now be lapped over the forward flaps 25, of the curtains 22, 22', and the same secured together with the fastenings 27 carried thereby. Upon the unfastening of any or all of the several curtains from their closed position, the spring tapes 34 will automatically rewind upon the pins 35 within the drums or housings 36, and will consequently draw the curtains upwardly of the outer curved ends of the track ways and inwardly of the horizontal portions thereof, and until the lower or outer free edges of the curtains project for only a slight distance downwardly from the free ends of the curved portions of the said track ways. In the raising movement of the curtains, the flaps 24 and 25 are to be folded outwardly and against the outer face of the body portions thereof, so as to admit of the free and unobstructed passage of the curtains into position beneath the top covering $c$.

The lower portions of the curtains, immediately below the light inserts 26 thereof, are each provided with metal strips or rods 31' for the purpose of maintaining the body portions of the same between the flaps 24 and 25 in substantially stretched or taut condition at all times and to further prevent any tendency of the same to sag or buckle.

From the foregoing, it will be readily apparent that the invention provides for a novel mounting of the curtains of a vehicle, and particularly of an automobile, in position to be entirely out of the way when not in use, but are ready at all times to be manipulated to and from operative or side closing positions, which arrangement and operation admits of the more rapid changing of the vehicle or automobile, from an open condition to a closed condition, or vice versa, and without the usual rough handling to which they are subjected when of the type requiring the rolling of the same for storage purposes within the vehicle when not in use, and the unrolling and fastening thereof in position about the sides of the latter, when it is desired to make use of the same to close the open sides of the vehicle or automobile.

It is to be understood that, while a preferred embodiment of the curtain constructions and mountings therefor have been described and illustrated herein in specific terms and details of construction, arrangement and operation, various changes in and modifications of the same may be resorted to without departing from the spirit of the invention, or the scope of the claims appended hereto.

Having thus particularly described the invention, what is claimed, is:—

1. A vehicle top comprising a plurality of oppositely disposed tracks, each of said tracks formed of a pair of spaced and opposed trackway sections adapted to be secured with the lower face of a vehicle top, each of said sections having its outer end curved downwardly, a curtain associated with each track, a rod carried by the upper end of each of the curtains and provided with a roller at each end traveling in the track and further provided with a pair of eyes, means for fastening said curtains in side closing positions, and a pair of automatically windable spring elements having their upper ends anchored with the vehicle top and the lower ends connected to the pair of eyes and windable on themselves for automatically returning the curtain to inoperative position when the curtain is released.

2. A vehicle top comprising a track formed of a pair of spaced and grooved trackway sections adapted to be secured with the lower face of the vehicle top, each of said sections having its outer end curving downwardly, a bodily shiftable permanently extended one-piece curtain, a rod connected to the upper end of the curtain and provided with grooved rollers traveling on said sections, a housing arranged at the inner ends of each of said sections and adapted to be secured to the vehicle top and provided with duplex guiding means, a rotatable element carried by each housing, and a pair of automatically windable elongated narrow flat springs each extending through said guiding means and having its upper end anchored to a rotatable element and its outer end connected to said rod and further adapted to have its upper portion automatically wind onto said rotatable element, when the curtain is released from closing position whereby the curtain will be automatically raised in an extended position.

3. A vehicle top comprising a track formed of a pair of spaced and grooved trackway sections adapted to be secured with the lower face of the vehicle top, each of said sections having its outer end curving downwardly, a bodily shiftable permanently extended one-piece curtain, a rod connected to the upper end of the curtain and provided with grooved rollers traveling on said sections, a housing arranged at the inner ends of each of said sections and adapted to be secured to the vehicle top and provided with duplex guiding means, a rotatable element carried by each housing, a pair of automatically windable elongated narrow flat springs each extending through said guiding means and having its upper end anchored to a rotatable element and its outer end connected to said rod and further adapted to have its upper portion automatically wind onto said rotatable element, when the curtain is released from closing position whereby the curtain will be automatically raised in an extended position, and transversely extending curtain guiding members arranged between said sections at the outer portion thereof.

In testimony whereof, I affix my signature hereto.

HENRY LATIFF.